United States Patent
Pan et al.

(10) Patent No.: US 9,173,264 B2
(45) Date of Patent: Oct. 27, 2015

(54) LED CONTROL DEVICE FOR PHASE-CUT DIMMING SYSTEM AND CONTROL METHOD THEREOF

(71) Applicant: Richtek Technology Corporation, Zhubei, Hsinchu County (TW)

(72) Inventors: Jiun-Hung Pan, Taipei (TW); Chien-Fu Tang, Hsinchu (TW); Isaac Y. Chen, Zhubei (TW); Tsung-Hsi Yang, New Taipei (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 233 days.

(21) Appl. No.: 13/926,538

(22) Filed: Jun. 25, 2013

(65) Prior Publication Data

US 2013/0342127 A1    Dec. 26, 2013

(30) Foreign Application Priority Data

Jun. 25, 2012 (TW) .............................. 101122581 A

(51) Int. Cl.
*H05B 33/08* (2006.01)
(52) U.S. Cl.
CPC ........ *H05B 33/0839* (2013.01); *H05B 33/0827* (2013.01)
(58) Field of Classification Search
CPC ........... H05B 33/0839; H05B 33/0827; H05B 33/0809; H05B 33/0815
See application file for complete search history.

(56) References Cited

U.S. PATENT DOCUMENTS

| 6,011,357 | A | 1/2000 | Gradzki et al. | |
|---|---|---|---|---|
| 6,707,263 | B1 | 3/2004 | Prasad | |
| 8,334,661 | B2 * | 12/2012 | Lee et al. | 315/291 |
| 8,502,461 | B2 * | 8/2013 | Shiu et al. | 315/192 |
| 8,629,630 | B2 * | 1/2014 | Shiu et al. | 315/307 |
| 8,664,893 | B2 * | 3/2014 | Lee et al. | 315/307 |
| 8,907,580 | B2 * | 12/2014 | Mednik | 315/209 R |
| 8,917,029 | B2 * | 12/2014 | Chu et al. | 315/224 |
| 2010/0141178 | A1 | 6/2010 | Negrete et al. | |
| 2011/0037418 | A1 | 2/2011 | Park | |
| 2011/0101877 | A1 | 5/2011 | Zhan et al. | |
| 2011/0115395 | A1 | 5/2011 | Barrow et al. | |
| 2012/0176048 | A1 * | 7/2012 | Li et al. | 315/186 |
| 2012/0176050 | A1 * | 7/2012 | Li et al. | 315/192 |

FOREIGN PATENT DOCUMENTS

CN         101583216 A       11/2009
CN         102421226 A       4/2012

* cited by examiner

*Primary Examiner* — Jung Kim
(74) *Attorney, Agent, or Firm* — Birch, Stewart, Kolasch & Birch, LLP

(57) ABSTRACT

An LED control device for configuring a phase-cut dimming system includes an LED and a switch. The LED control device configures the conduction status of the switch so as to supply power to the LED according to an input signal. The LED control device further detects whether the input signal is phase-cut. When the input signal is phase-cut, the LED control device stores the signal values of the internal circuits. Afterward, when the input signal is not phase-cut, the LED control device restores the stored signal values so that the internal circuits may resume to the previous operation status rapidly.

12 Claims, 7 Drawing Sheets

LED CONTROL DEVICE FOR PHASE-CUT DIMMING SYSTEM AND CONTROL METHOD THEREOF

CROSS-REFERENCE TO RELATED APPLICATIONS

This application claims the benefit of priority to Patent Application No. 101122581, filed in Taiwan on Jun. 25, 2012; the entirety of which is incorporated herein by reference for all purposes.

BACKGROUND

The disclosure generally relates to an LED control device and, more particularly, to the LED control device utilized in the phase-cut dimming system.

The LEDs (light emitting diodes) have the advantages of high luminous efficacy, long product life, compact dimensions, fast startup time, high reliability, high durability, etc. More and more people have replaced the traditional light sources with LEDs in the indoor and the outdoor environment, e.g., the house, the office, the billboard and the streetlamps.

The LEDs, however, may malfunction when cooperating with traditional circuits or control devices. For example, many traditional light sources may cooperate with the phase-cut dimming circuit for adjusting the brightness of the light sources. The phase-cut dimming circuit may comprise the TRIAC (triode for alternating current), the diode or other suitable circuit elements for cutting off part of the AC input signal so that the brightness of the light sources may be adjusted accordingly. When the AC input signal is cut off, the voltage or the current of the AC input signal is configured to be zero or a small value. In this field, the conduction angle is known as 180 degrees minus the angle corresponding to the cut-off portion of the AC input signal. For example, when the AC input signal is not cut off at all, the conduction angle is 180 degrees. When the AC input signal is completely cut off, the conduction angle is 0 degree.

Moreover, the LED control device is needed to drive the LEDs, stabilize the voltage, stabilize the current, adjust the power factor, etc. The LED control device, however, causes problems when adjusting the brightness of the LED in the phase-cut dimming system. For example, when the phase-cut portion of the AC input signal is too small (i.e., the conduction angle is large), the LED control device will perform the compensation operation to stabilize the voltage and/or the current. When the conduction angle is large, the voltage and/or the current supplied to the LED almost do not vary because of the compensation operations of the LED control device, and the brightness of the LED cannot be adjusted. Therefore, when the conduction angle is large, the dimming function cannot be performed correctly. The dimming linearity of the LED dimming system is affected, and the user cannot easily adjust the LED to the desired brightness.

Moreover, there are also other problems when the phase-cut dimmer cooperates with the LED to perform the dimming function. For example, when the AC input signal is phase-cut, the LED control device is not powered. Afterward, when the AC input signal is no longer phase-cut, some circuits in the LED control device will be restarted. In the period of restarting the circuits, the voltage and/or the current supplied to the LED usually differ from the value(s) before the AC input signal is phase-cut. Therefore, the dimming linearity of the LED dimming system is also affected, and the LED may even flicker. The users would notice and feel uncomfortable when the LED flickers in the phase-cut dimming system.

SUMMARY

In view of the foregoing, it may be appreciated that a substantial need exists for methods and apparatuses that mitigate or reduce the problems above.

An example embodiment of an LED control device for configuring a phase-cut dimming system according to a input signal; wherein the phase-cut dimming system comprises an LED and a current switch; comprising: a current control circuit for coupling with the current switch, and for generating a second output signal according to a current flowing through the current switch; a driving signal generating circuit for coupling with a control terminal of the current switch and the current control circuit, and for generating a driving signal to configure a conduction status of the current switch according to the second output signal and a periodic signal; and a phase-cut detection circuit for receiving the input signal, and for comparing the input signal with a second reference signal; wherein in a first period in which the input signal is greater than the second reference signal, the phase-cut detection circuit configures a signal value of a second storage device to vary with the second output signal; in a second period in which the input signal is less than the second reference signal, the phase-cut detection circuit configures the second storage device to keep the signal value of the second storage device so as not to vary with the second output signal; in a third period in which the input signal is greater than the second reference signal, the phase-cut detection circuit configures the signal value of the second storage device to vary with the second output signal; and the second storage device is configured to be operably coupled with the current control circuit and the driving signal generating circuit.

Another example embodiment of an LED control device for configuring a phase-cut dimming system according to a input signal; wherein the phase-cut dimming system comprises an LED and a current switch, and a current flowing through the current switch flows through a resistor to generate a detection voltage signal; comprising: a current control circuit for coupling with the current switch, and for generating a second output signal according to the current flowing through the current switch; a driving signal generating circuit for coupling with a control terminal of the current switch and the current control circuit, and for generating a driving signal to configure a conduction status of the current switch according to the second output signal and a periodic signal; and a phase-cut detection circuit for receiving the detection voltage signal, and for comparing the detection voltage signal with a third reference signal; wherein in a first period in which the detection voltage signal is greater than the third reference signal, the phase-cut detection circuit configures a signal value of a second storage device to vary with the second output signal; in a second period in which the detection voltage signal is less than the third reference signal, the phase-cut detection circuit configures the second storage device to keep the signal value of the second storage device so as not to vary with the second output signal; in a third period in which the detection voltage signal is greater than the third reference signal, the phase-cut detection circuit configures the signal value of a second storage device to vary with the second output signal; and the second storage device is configured to be operably coupled with the current control circuit and the driving signal generating circuit.

Another example embodiment of a control method for configuring a phase-cut dimming system according to a input signal; wherein the phase-cut dimming system comprises an LED and a current switch; comprising: generating a second output signal according to a current flowing through the current switch; generating a driving signal to configure a conduction status of the current switch according to the second output signal and a periodic signal; and in a first period in which the input signal is not phase-cut, configuring a signal value of a second storage device to vary with the second output signal; in a second period in which the input signal is phase-cut, configuring the second storage device to keep the signal value of the second storage device so as not to vary with the second output signal; and in a third period in which the input signal is not phase-cut, configuring the signal value of the second storage device to vary with the second output signal.

Another example embodiment of a control method for configuring a phase-cut dimming system according to a input signal; wherein the phase-cut dimming system comprises an LED and a current switch and a current switch, and a current flowing through the current switch flows through a resistor to generate a detection voltage signal; comprising: generating a second output signal according to a current flowing through the current switch; generating a driving signal to configure a conduction status of the current switch according to the second output signal and a periodic signal; and comparing the detection voltage signal with a third reference signal to determine whether the input signal is phase-cut; in a first period in which the input signal is not phase-cut, configuring a signal value of a second storage device to vary with the second output signal; in a second period in which the input signal is phase-cut, configuring the second storage device to keep the signal value of the second storage device so as not to vary with the second output signal; and in a third period in which the input signal is not phase-cut, configuring the signal value of the second storage device to vary with the second output signal.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
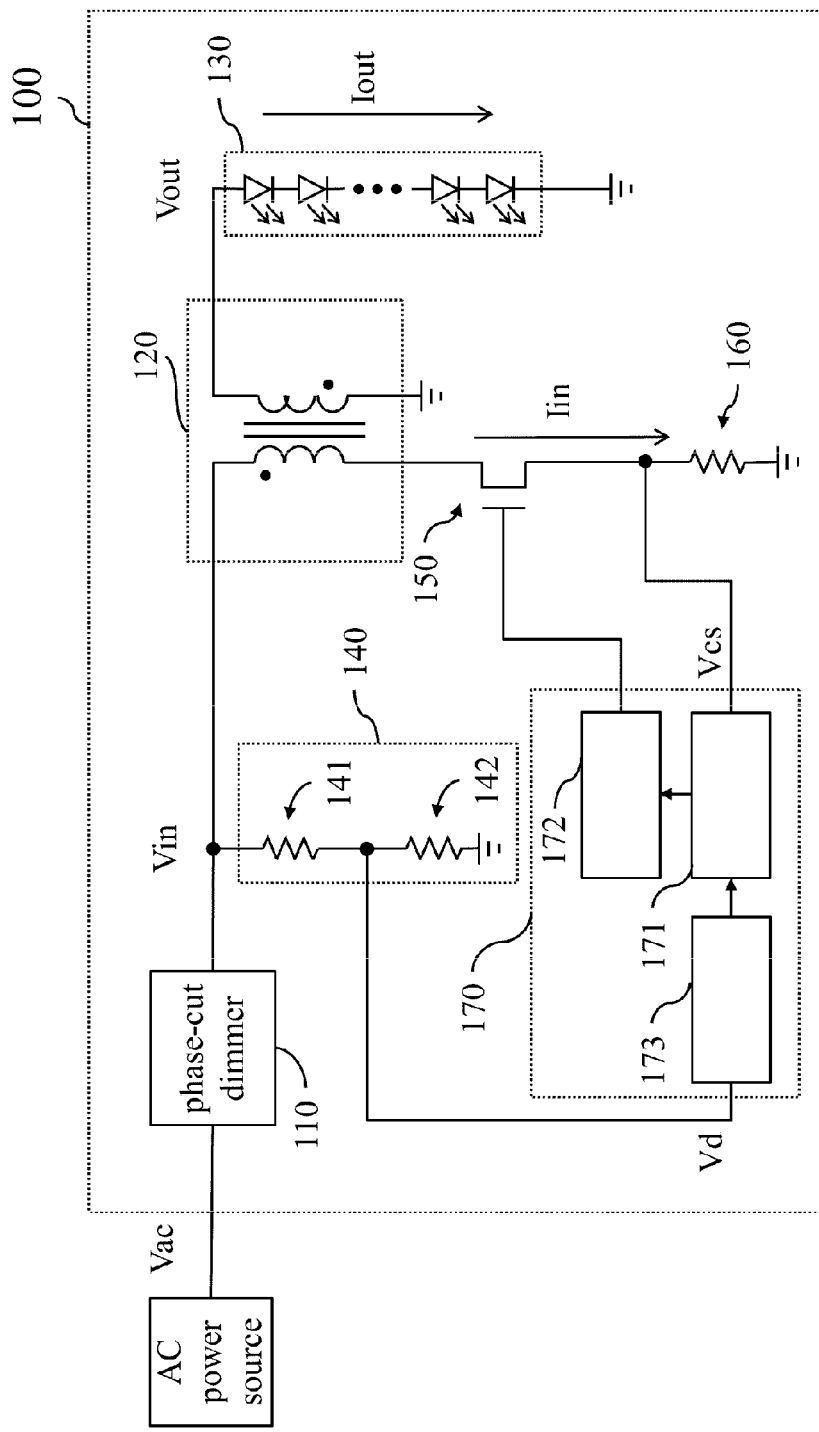
FIG. 1 shows a simplified functional block diagram of a phase-cut dimming system according to one embodiment of the present disclosure.

FIG. 1 shows a simplified functional block diagram of a phase-cut dimming system 100 according to one embodiment of the present disclosure. The phase-cut dimming system 100 comprises a phase-cut dimmer 110, a transformer 120, a group of LEDs 130, a voltage dividing circuit 140, a current switch 150, a resistor 160 and a LED control device 170. For the purposes of conciseness and clear explanation, some components, signals and connections thereof are not shown in FIG. 1. For example, the protection circuit for the LEDs 130 and some impedance circuit elements are not shown in FIG. 1.

The phase-cut dimmer 110 is coupled with the AC power source to receive the AC input signal Vac and to generate the corresponding input signal Vin. The phase-cut dimmer 110 may generate the input signal Vin with a phase-cut portion configured by the user. For example, the user may configure the phase-cut portion of the AC input signal Vac by turning a knob or moving a slide bar (not shown in FIG. 1) of the phase-cut dimmer. In this embodiment, the phase-cut dimmer 100 further comprises the circuit to perform the full wave rectification function for generating the input signal Vin according to the AC input signal Vac.

Figure 2:
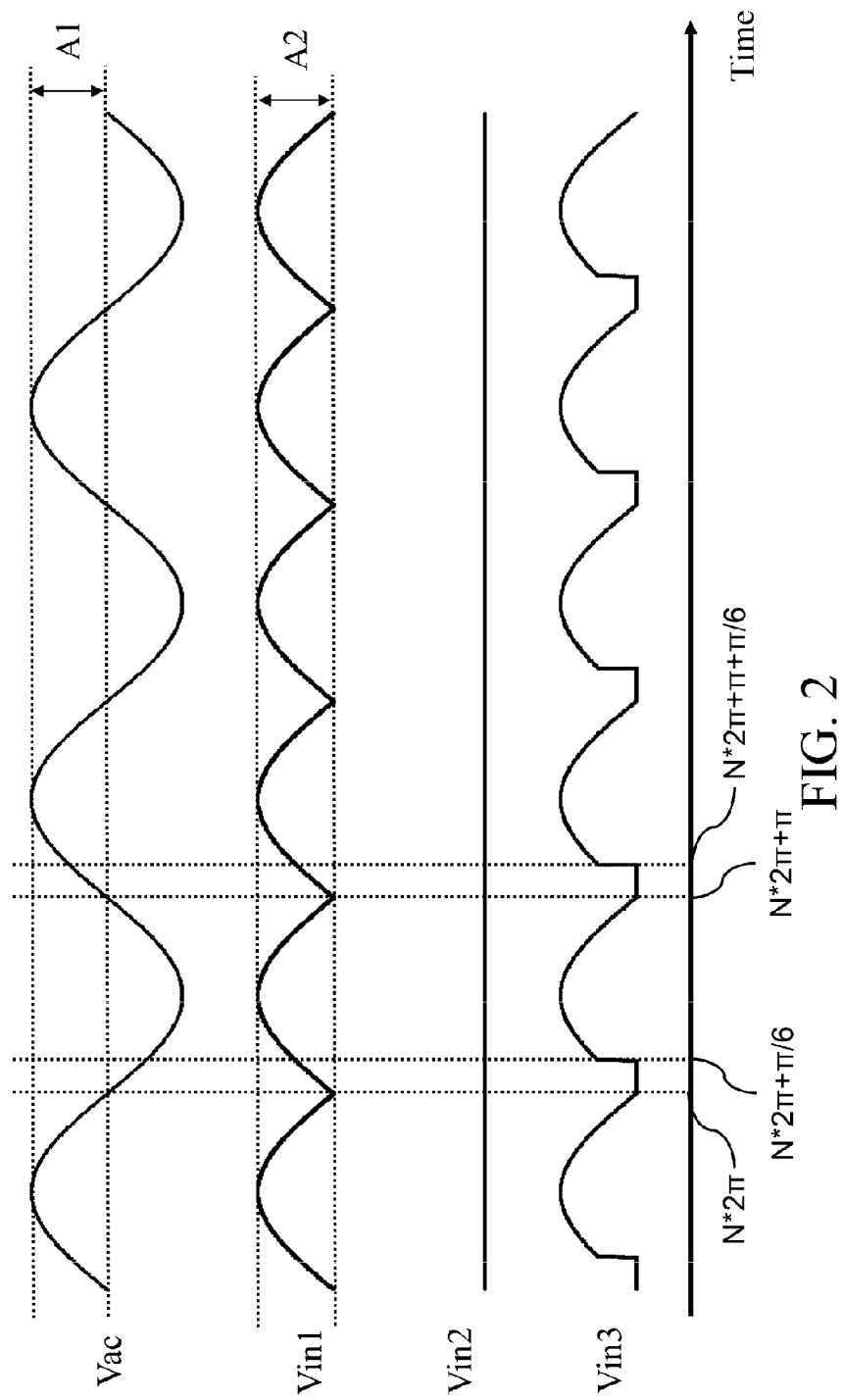
FIG. 2 shows simplified waveforms of the AC input signal and several phase-cut signals of the phase-cut dimming system in FIG. 1.

FIG. 2 shows simplified waveforms of the AC input signal Vac and several phase-cut signals of the phase-cut dimming system 100 in FIG. 1. In this embodiment, the AC input signal Vac is a sinusoidal signal and expressed as Vac=A1*sin($\omega$t) wherein A1 and $\omega$ are respectively the amplitude and the angular frequency of the AC input signal Vac. The phase-cut dimmer 110 may be configured to generate the input signal Vin with the required phase-cut portion. For example, in FIG. 2, the input signal Vin1 is a signal without being phase-cut (i.e., the conduction angle of the input signal Vin1 is 180 degrees). The input signal Vin2 is a signal with the signal being completely phase-cut (i.e., the conduction angle of the input signal Vin 2 is 0 degree). The input signal Vin3 is a signal with a 0~30 degrees (0~$\pi$/6) of phase-cut portion and a 180~210 degrees ($\pi$~$\pi$+$\pi$/6) of phase-cut portions (i.e., the conduction angle is 150 degrees). The input signal Vin may be configured to be Vin=A2*|sin($\omega$t)|, wherein A2 is the amplitude of the input signal Vin and may be configured to be greater than, equal to or less than the amplitude A1 of the AC input signal Vac. Moreover, the phase-cut dimmer 110 need a processing time for generating the input signal Vin according to the AC input signal Vac. For the purposes of conciseness and clear explanation, the signals Vac, Vin1, Vin2 and Vin3 are shown in FIG. 2 without illustrating the processing time of the phase-cut dimmer 110. In the description and the claims, when a signal is referred to be phase-cut, it means the voltage or the current of the signal is equal to zero or a small signal value.

In this embodiment, one side of the transformer 120 is coupled between the phase-cut dimmer 110 and the current switch 150, and the other side of the transformer 120 is coupled between a predetermined voltage level (e.g., the ground) and the LEDs 130. The transformer 120 may be configured to generate the required output voltage Vout according to the input signal Vin and the conduction status of the current switch 150. The output voltage Vout is supplied to the LEDs 130 for illuminating the LEDs 130.

The LEDs 130 are coupled between the transformer 120 and a predetermined voltage level (e.g., the ground). The LEDs 130 may be realized by one or more LED packages each comprising one or more LED dies for generating the required brightness.

The voltage dividing circuit 140 is coupled with the phase-cut dimmer 110 and a predetermined voltage level (e.g., the ground), and comprises resistors 141 and 142 to generate a voltage dividing signal Vd at a suitable voltage level for transmitting to the LED control device 170. In other embodiments, the voltage dividing circuit 140 may be realized with other suitable active circuit elements and/or passive circuit elements for generating the voltage dividing signal Vd at a suitable voltage level.

One terminal of the current switch 150 is coupled with the transformer 120, and the other terminal of the current switch 150 is coupled with a predetermined voltage level (e.g., the ground) through the resistor 160. The control terminal of the current switch 150 is coupled with the LED control device 170. The current switch 150 may be realized with one or more FETs, BJTs, other suitable type of transistors and/or other suitable type of switch elements. The current switch 150 may be configured to be conducted or not conducted according to the configuration of the LED control device 170 so that the input signal Vin may cause a current flowing through the transformer 120 and the current switch 150. The transformer 120 may generate an output current Iout accordingly for supplying to the LEDs 130. Moreover, when the current Iin flows through the resistor 160, a detection voltage signal Vcs may be detected at a terminal of the resistor 160.

The LED control device 170 is coupled with the voltage dividing circuit 140, the current switch 150 and the resistor 160. In this embodiment, the LED control device 170 further comprise a current control circuit 171, a driving signal generating circuit 172 and a phase-cut detection circuit 173.

The current control circuit 171 receives the detection voltage signal Vcs, and generates an output signal according to the detection voltage signal Vcs so that the driving signal generating circuit 172 may generate the required driving signal accordingly.

The driving signal generating circuit 172 may be configured to generate the driving signal for transmitting to the control terminal of the current switch 150 (e.g., the gate terminal of the FET or the base terminal of the BJT). Therefore, the current switch 150 may be configured to be conducted or not conducted at the suitable time so that the transformer 120 may generate the require output signal Vout and the required output current Iout according to the input signal Vin.

The voltage dividing circuit 150 may generate the voltage dividing signal Vd by scaling the input signal Vin to the suitable signal level, and the voltage dividing signal Vd may therefore be utilized to determine whether the input signal Vin is phase-cut. In this embodiment, the phase-cut detection circuit 173 receives the voltage dividing signal Vd from the voltage dividing circuit 140 for determining whether the input signal Vin is phase-cut. Therefore, the phase-cut detection circuit 173 may generate one or more suitable control signals for configuring the current control circuit 171 to operate in the suitable mode.

Figure 3:
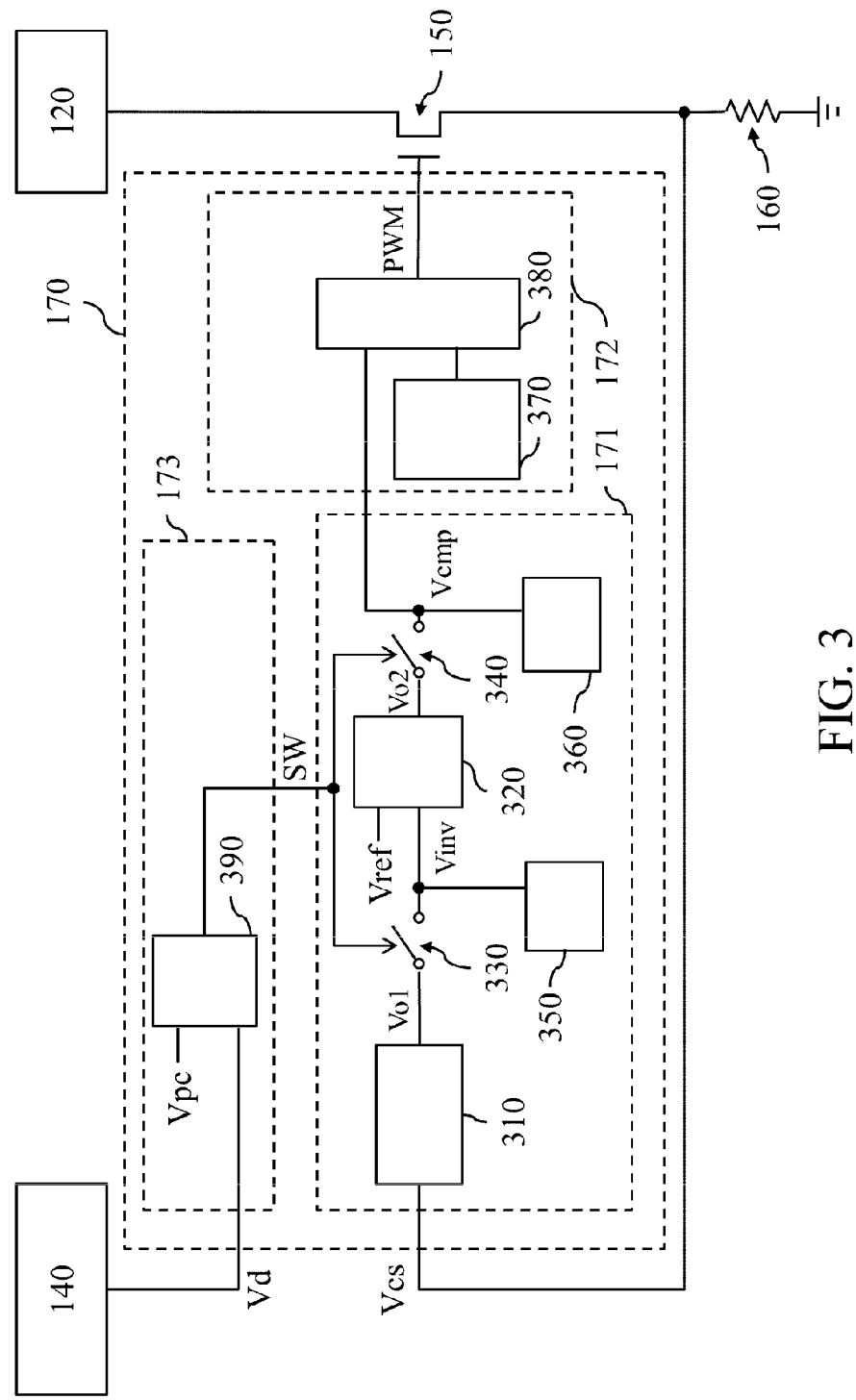
FIG. 3 shows a simplified functional block diagram of the LED control device of the phase-cut dimming system in FIG. 1 according to one embodiment of the present disclosure.
Figure 4:
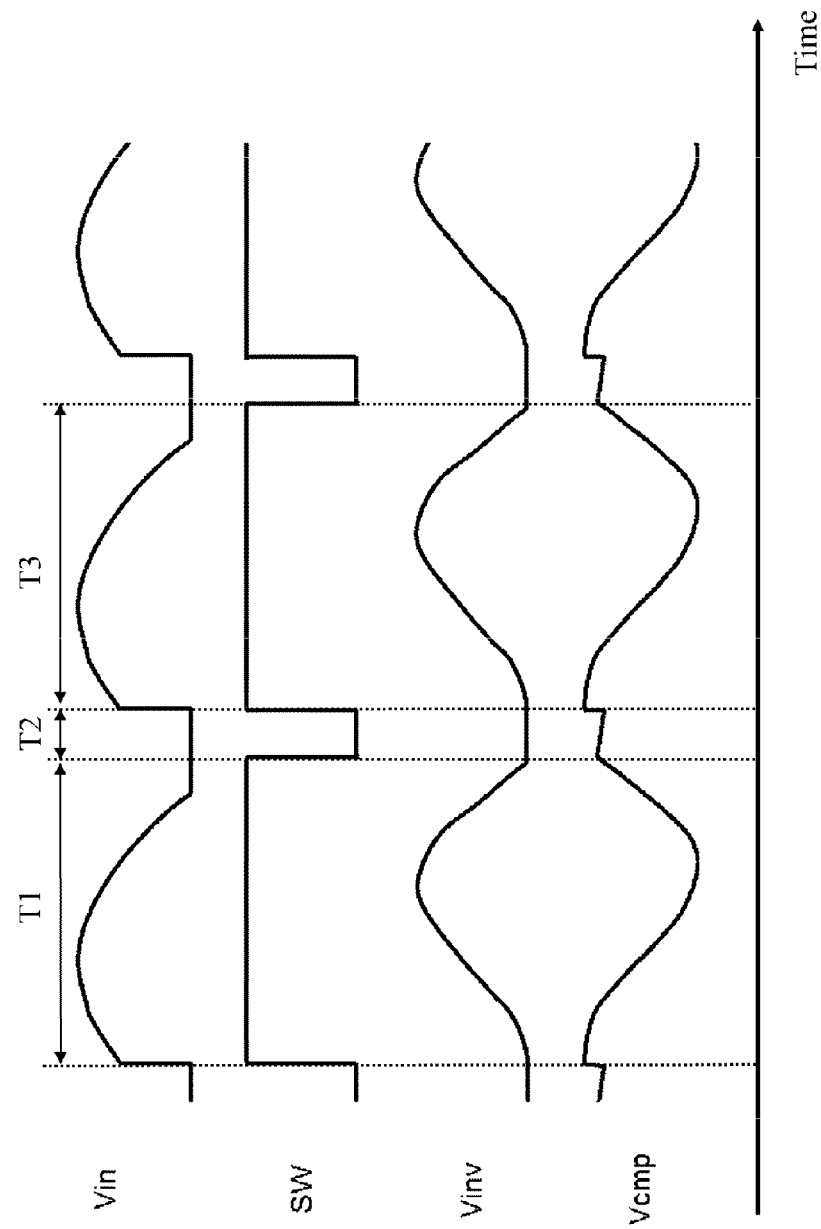
FIG. 4 shows simplified waveforms of several signals of the phase-cut dimming system in FIG. 1.

FIG. 3 shows a simplified functional block diagram of the LED control device 170 of the phase-cut dimming system 100 in FIG. 1 according to one embodiment of the present disclosure. FIG. 4 shows simplified waveforms of several signals of the phase-cut dimming system 100 in FIG. 1. The operations of the phase-cut dimming system 100 are further explained below with FIGS. 3 and 4. For the purpose of conciseness and clear explanation, some components, signals and connections thereof are not shown in FIG. 3

The current control circuit 171 comprises a signal processing circuit 310, a comparator circuit 320, switches 330 and 340 and storage devices 350 and 360.

The signal processing circuit 310 may be configured to generate a first output signal Vo1 according to the detection voltage signals Vcs received in a predetermined period. For example, the signal processing circuit 310 may generate the first output signal Vo1 according to an average value, an accumulated value or other suitable computation values of the detection voltage signals Vcs received in the period T1 in FIG. 4.

In one embodiment, the signal processing circuit 310 may be realized with a low pass filtering circuit, which comprises one or more resistors, inductors, capacitors, active circuit elements and/or passive elements. The low pass filter may filter the detection voltage signals Vcs received in the predetermined period to generate the average value of the detection voltage signals Vcs. In another embodiment, the signal process circuit 310 may be realized with the integrator circuit comprising one or more amplifiers, the integrator circuit comprising the switched capacitor circuit or the integrator circuit comprising one or more resistors, inductors, capacitors, active circuit elements and/or passive elements. The integrator circuit may accumulate the detection voltage signals Vcs received in the predetermined period to generate the accumulated value of the detection voltage signals Vcs.

In the period T1 in FIG. 4, the control signal SW of the switch 330 is active (high voltage level in this embodiment) and the switch 330 is configured to be conducted. The first output signal Vo1 of the signal processing circuit 310 is transmitted to an input terminal of the comparator circuit 320 and the storage device 350. Therefore, the voltage Vinv at the input terminal of the comparator circuit 320 and the storage device 350 varies with the first output signal Vo1 of the signal processing circuit 310 in the period T1.

In the period T2 in FIG. 4, the control signal SW of the switch 330 is inactive (low voltage level in this embodiment) and the switch 330 is configured to be not conducted. The impedance at the input terminal of the comparator circuit 320 is usually high. The voltage signal Vinv at the storage device 350 does not easily vary because a current does not easily flow to the input terminal of the comparator circuit 320. Therefore, the voltage Vinv at the input terminal of the comparator circuit 320 and the storage device 350 does not vary with the first output signal Vo1 of the signal processing circuit 310 in the period T2.

In the period T3 in FIG. 4, the control signal SW of the switch 330 is active (high voltage level in this embodiment) again and the switch 330 is configured to be conducted. The first output signal Vo1 of the signal processing circuit 310 is transmitted to the input terminal of the comparator circuit 320 and the storage device 350. Therefore, the voltage Vinv at the input terminal of the comparator circuit 320 and the storage device 350 varies with the first output signal Vo1 of the signal processing circuit 310 again in the period T3.

The comparator circuit 320 may be configured to generate a second output signal Vo2 by comparing the voltage signal Vinv and a predetermined voltage signal Vref. The second output signal Vo2 is transmitted to the driving signal generating circuit 172 so that the driving signal generating circuit 172 may generate the driving signal PWM accordingly. For example, in one embodiment, when the reference voltage signal Vref is greater than the voltage signal Vinv, the second output signal Vo2 generated by the comparator circuit 320 is equal to K*(Vref−Vinv), wherein K is configured to be a suitable value.

In the period T1 in FIG. 4, the control signal SW of the switch 340 is active (high voltage level in this embodiment) and the switch 340 is configured to be conducted. The second output signal Vo2 of the comparator circuit 320 is transmitted to an input terminal of the comparator circuit 380 of the driving signal generating circuit 172 and the storage device 360. Therefore, the voltage Vcmp at the input terminal of the comparator circuit 380 of the driving signal generating circuit 172 and the storage device 360 varies with the second output signal Vo2 of the comparator circuit 320 in the period T1.

In the period T2 in FIG. 4, the control signal SW of the switch 340 is inactive (low voltage level in this embodiment) and the switch 340 is configured to be not conducted. The impedance at the input terminal of the comparator circuit 380 is usually high. The voltage signal Vcmp at the storage device 360 does not easily vary because the current does not easily flow to the input terminal of the comparator circuit 380 of the driving signal generating circuit 172. Therefore, the voltage Vcmp at the input terminal of the comparator circuit 380 of the driving signal generating circuit 172 and the storage device 360 does not vary with the second output signal Vo2 of the comparator circuit 320 in the period T2.

In the period T3 in FIG. 4, the control signal SW of the switch 340 is active (high voltage level in this embodiment) and the switch 340 is configured to be conducted. The second output signal Vo2 of the comparator circuit 320 is transmitted to the input terminal of the comparator circuit 380 of the driving signal generating circuit 172 and the storage device 360. Therefore, the voltage Vcmp at the input terminal of the comparator circuit 380 of the driving signal generating circuit 172 and the storage device 360 varies with the second output signal Vo2 of the comparator circuit 320 again in the period T3.

The switches 330 and 340 are configured to be conducted or not conducted according to the control signal SW generated by the phase-cut detection circuit 173. In this embodiment, when the control signal SW is active (e.g., high voltage level in the active high signaling representation), the switches 330 and 340 are configured to be conducted. When the control signal SW is inactive (e.g., low voltage level in the active high signaling representation), the switches 330 and 340 are configured to be not conducted. In other embodiments, the switches 330 and 340 may be simultaneously or not simultaneously configured according to one or more control signals.

The storage devices 350 and 360 may be realized with capacitors, registers or other suitable memory units. When the switches 330 and 340 are conducted, the signal values of the storage devices 350 and 360 respectively vary with the first output signal Vo1 of the signal processing circuit 310 and the second output signal Vo2 of the comparator circuit 320. When the switches 330 and 340 are not conducted, the storage device 350 and 350 are configured to keep the signal value.

In this embodiment, the driving signal generating circuit 172 generates the pulse width modulated signal PWM for configuring the conduction status of the current switch 150. The driving signal generating circuit 172 comprises a ramp signal generating circuit 370 and a comparator circuit 380.

The ramp signal generating circuit 370 may be realized with the oscillating circuit, active circuit elements and/or passive circuit elements to generate ramp signals for transmitting to the input terminal of the comparator circuit 380. In other embodiments, the ramp signal generating circuit 370 may be replaced by other periodic signal generating circuit to generate periodic signals for transmitting to the comparator circuit 380.

The comparator circuit 380 generates the pulse width modulated signal PWM by comparing the voltage signal Vcmp and the ramp signal generated by the ramp signal generating circuit 370. For example, when the voltage signal Vcmp is greater than the ramp signal, the comparator circuit 380 configures the pulse width modulated signal PWM to be in the high voltage level. When the voltage signal Vcmp is less than the ramp signal, the comparator circuit 380 configures the pulse width modulated signal PWM to be in the low voltage level.

The phase-cut detection circuit 173 comprises a comparator circuit 390. The comparator circuit 390 compares the voltage dividing signal Vd and a reference voltage signal Vpc to determine whether the input signal Vin is phase-cut and to generate the corresponding control signal SW. The reference voltage signal Vpc may be configured to be zero or a value slightly greater than zero (e.g., 0.1 volt or other suitable signal value).

In the period T1 in FIG. 4, when the voltage dividing signal Vd is greater than the reference voltage signal Vpc, the phase-cut detection circuit 173 determines the input signal Vin is not phase-cut. Accordingly, the phase-cut detection circuit 173 configures the control signal SW to be active so that the switches 330 and 340 become conducted. The first output signal Vo1 of the signal processing circuit 310 is transmitted to the input terminal of the comparator circuit 320 and the storage device 350. The second output signal Vo2 of the comparator circuit 320 is transmitted to the input terminal of the driving signal generating circuit 172 and the storage device 360. Thus, in the period T1, the voltage signal Vinv of the storage device 350 and the voltage signal Vcmp of the storage device 360 respectively vary with the first output signal Vo1 of the signal processing circuit 310 and the second output signal Vo2 of the comparator circuit 320.

In practical implementation, the signal transmission and the signal processing take time. Therefore, even when the input signal Vin is phase-cut in the period T1, the phase-cut detection circuit 173 cannot detect it until the period T2 in FIG. 4. In the period T2 in FIG. 4, the voltage dividing signal Vd is less than the reference voltage signal Vpc so that the phase-cut detection circuit 173 determines the input signal Vin is phase-cut. The phase-cut detection circuit 173 configures the control signal SW to be inactive so that the switches 330 and 340 are not conducted. In the period T2, the storage devices 350 and 360 respectively keep their own signal values.

In the period T3 in FIG. 4, when the voltage dividing signal Vd is greater than the reference voltage signal Vpc, the phase-cut detection circuit 173 determines the input signal Vin is not phase-cut. Accordingly, the phase-cut detection circuit 173 configures the control signal SW to be active so that the switches 330 and 340 become conducted. The first output signal Vo1 of the signal processing circuit 310 is transmitted to the input terminal of the comparator circuit 320 and the storage device 350. The second output signal Vo2 of the comparator circuit 320 is transmitted to the input terminal of the driving signal generating circuit 172 and the storage device 360. Thus, in the period T3, the voltage signal Vinv of the storage device 350 starts from the signal value kept in the period T2 and varies with the first output signal Vo1 of the signal processing circuit 310. The voltage signal Vcmp of the storage device 360 starts from the signal value kept in the period T2 and varies with the second output signal Vo2 of the comparator circuit 320.

When the input signal Vin is phase-cut (e.g., in the period T2 in FIG. 4), the phase-cut detection circuit 173 configures the control signal SW to be inactive so that the switches 330 and 340 are not conducted. The storage devices 350 and 360 respectively keep their own signal value so that the voltage signal Vinv at the input terminal of the comparator circuit 320 and the voltage signal Vcmp at the input terminal of the comparator circuit 380 do not vary substantially.

When the input signal Vin is no longer phase-cut (e.g., in the period T3 in FIG. 4), the phase-cut detection circuit 173 configures the control signal SW to be active so that the switches 330 and 340 are conducted. The signal values of the storage devices 350 and 360 are kept at substantially the same value before the input signal Vin was phase-cut. The comparator circuits 320 and 380 may rapidly resume to the operation statuses (e.g., the operation statuses in operation T1 in FIG. 4) according to the signal values kept in the storage devices 350 and 360. Accordingly, a suitable pulse width modulated signal PWM may be generated to configure the conduction status of the current switch 150. The transformer 120 may therefore supply the required output voltage Vout and/or the required output current Iout to the LEDs 130 so as to obtain the required dimming effect.

In the above embodiments, the storage devices 350 and 360 may be configured to keep the signal values. Therefore, the comparator circuit 320 and 380 may operate in the similar operation status before and after the input signal Vin is phase-cut to prevent the LEDs 130 from flickering.

Because the current Iin is caused by applying the input signal Vin on the transformer 120 and the current switch 150, the waveforms of the current Iin and the input signal Vin are similar. When the input signal Vin is phase-cut, the current Iin therefore becomes zero or a very small value. Therefore, in other embodiments, the LED control device 170 may also detect whether the input signal Vin is phase-cut according to the detection voltage signal Vcs, which is generated by flowing the current Iin through the resistor 160.

Figure 5:
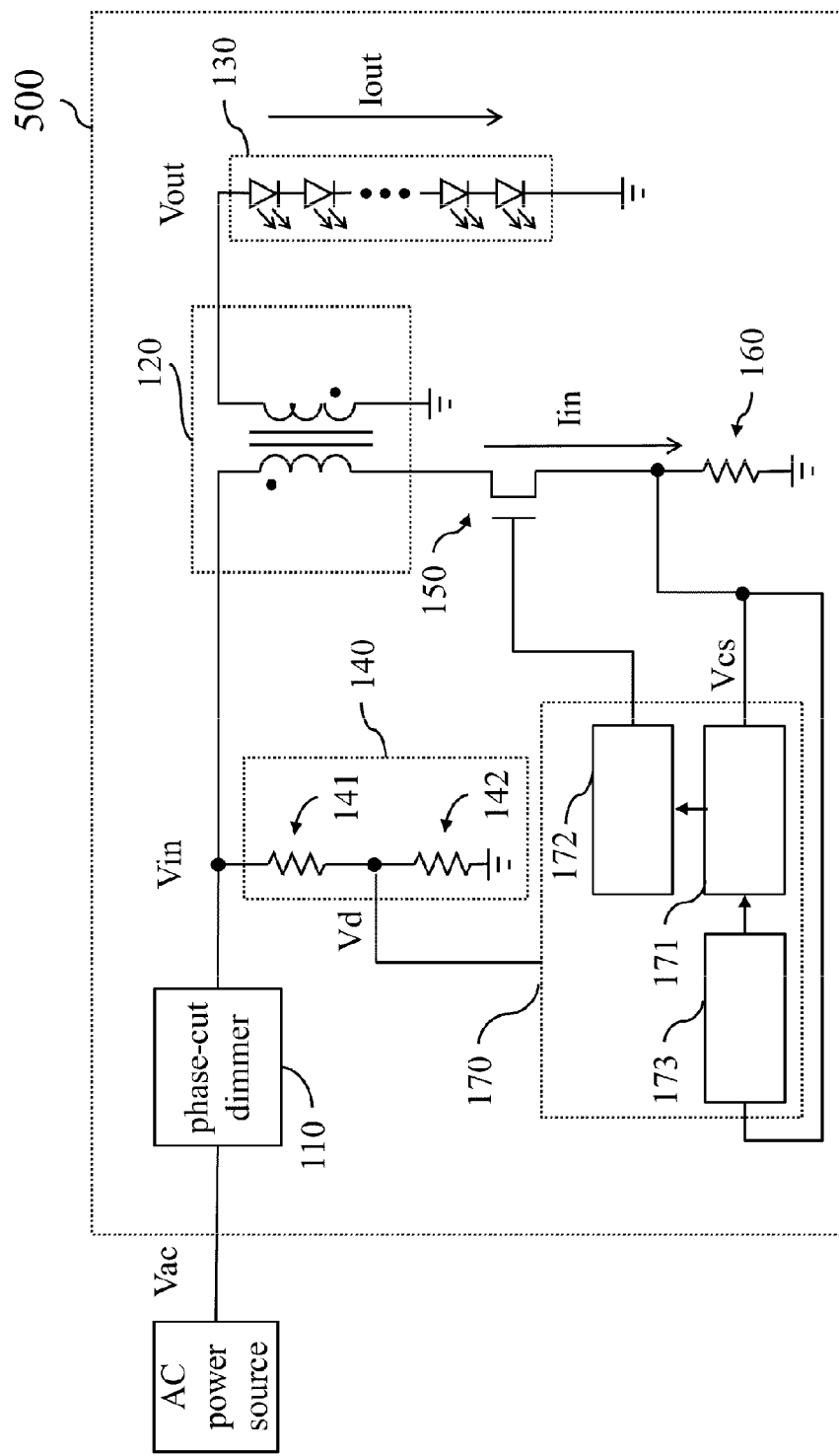
FIG. 5 shows a simplified functional block diagram of a phase-cut dimming system according to another embodiment of the present disclosure.

FIG. 5 shows a simplified functional block diagram of a phase-cut dimming system 500 according to another embodiment of the present disclosure. The phase-cut dimming system 500 comprises a phase-cut dimmer 110, a transformer 120, a group of LEDs 130, a voltage dividing circuit 140, a current switch 150, a resistor 160 and a LED control device 170. For the purposes of conciseness and clear explanation, some components, signals and connections thereof are not shown in FIG. 5.

The implementations, the operations and the description of the components in the dimmer system 100 may be applicable to the dimmer system 500. One difference, however, between the dimmer system 500 and the dimmer system 100 is that the LED control device 170 of the dimmer system 500 detects whether the input signal Vin is phase-cut according to the detection voltage signal Vcs and generates control signals for configuring the operation of the current control circuit 171. In the embodiment in FIG. 5, although the LED control device 170 still receives the voltage dividing signal Vd, the voltage dividing signal Vd is utilized by other circuits (not shown in FIG. 5).

Figure 6:
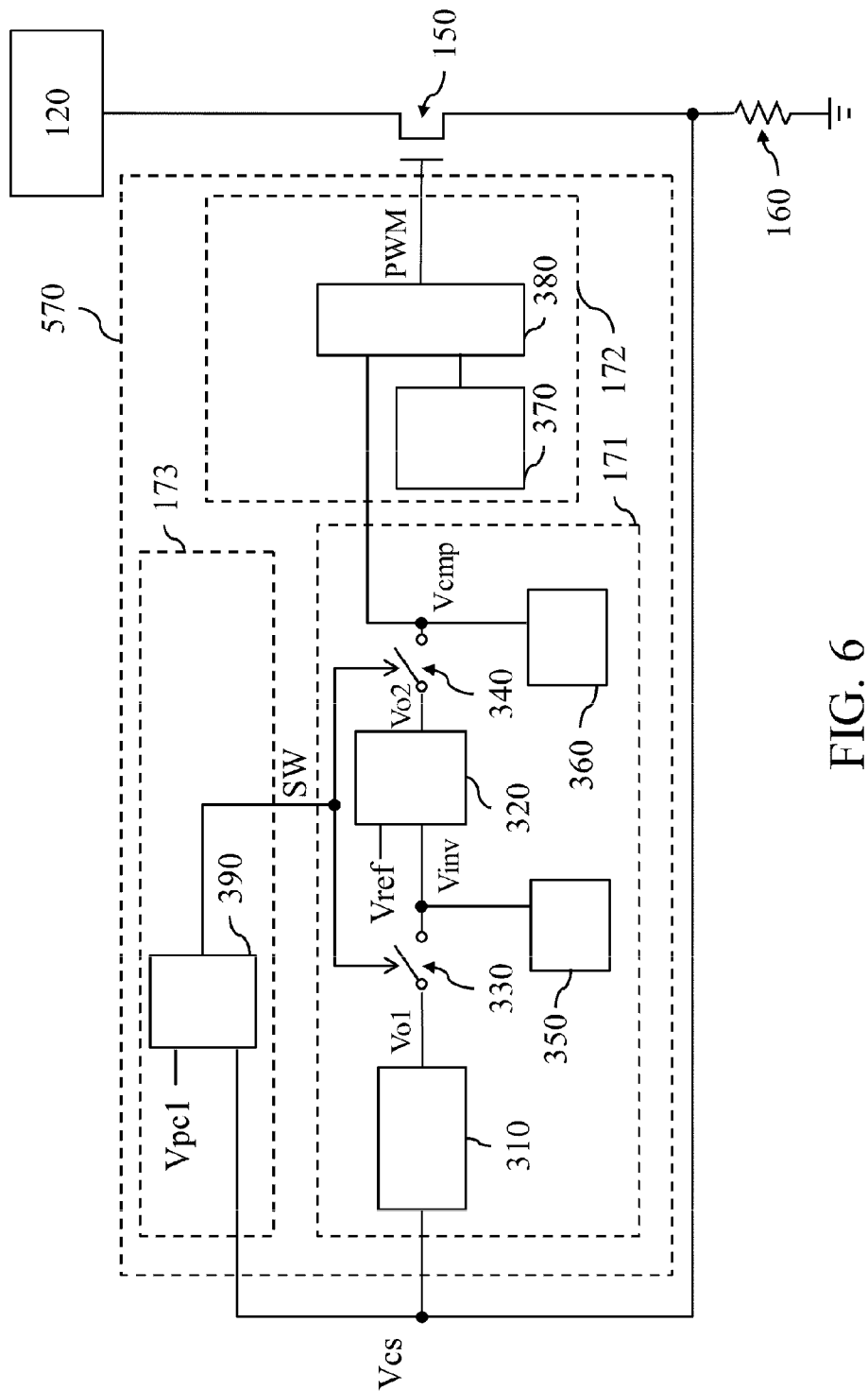
FIG. 6 shows a simplified functional block diagram of the LED control device of the phase-cut dimming system in FIG. 5 according to one embodiment of the present disclosure.

FIG. 6 shows a simplified functional block diagram of the LED control device 170 of the phase-cut dimming system 500 in FIG. 5 according to one embodiment of the present disclosure. In the embodiment in FIG. 6, the comparator circuit 390 determines whether the input signal Vin is phase-cut by comparing the detection voltage signal Vcs and the reference voltage signal Vpc1 and generates the corresponding control signal SW. The reference voltage signals Vpc and Vpc1 may be configured to be the same or different according to different design considerations. The implementations, the operations and the description of the components in the LED control device 170 in FIG. 3 may be applicable to the embodiment in FIG. 6, and not repeated here for the purpose of conciseness.

In the above embodiments, the dimmer systems with the flyback regulator are utilized to explanation. In other embodiment, the dimmer systems with other types of regulators may also be applicable, e.g., the boost type regulator and the buck type regulator.

Figure 7:
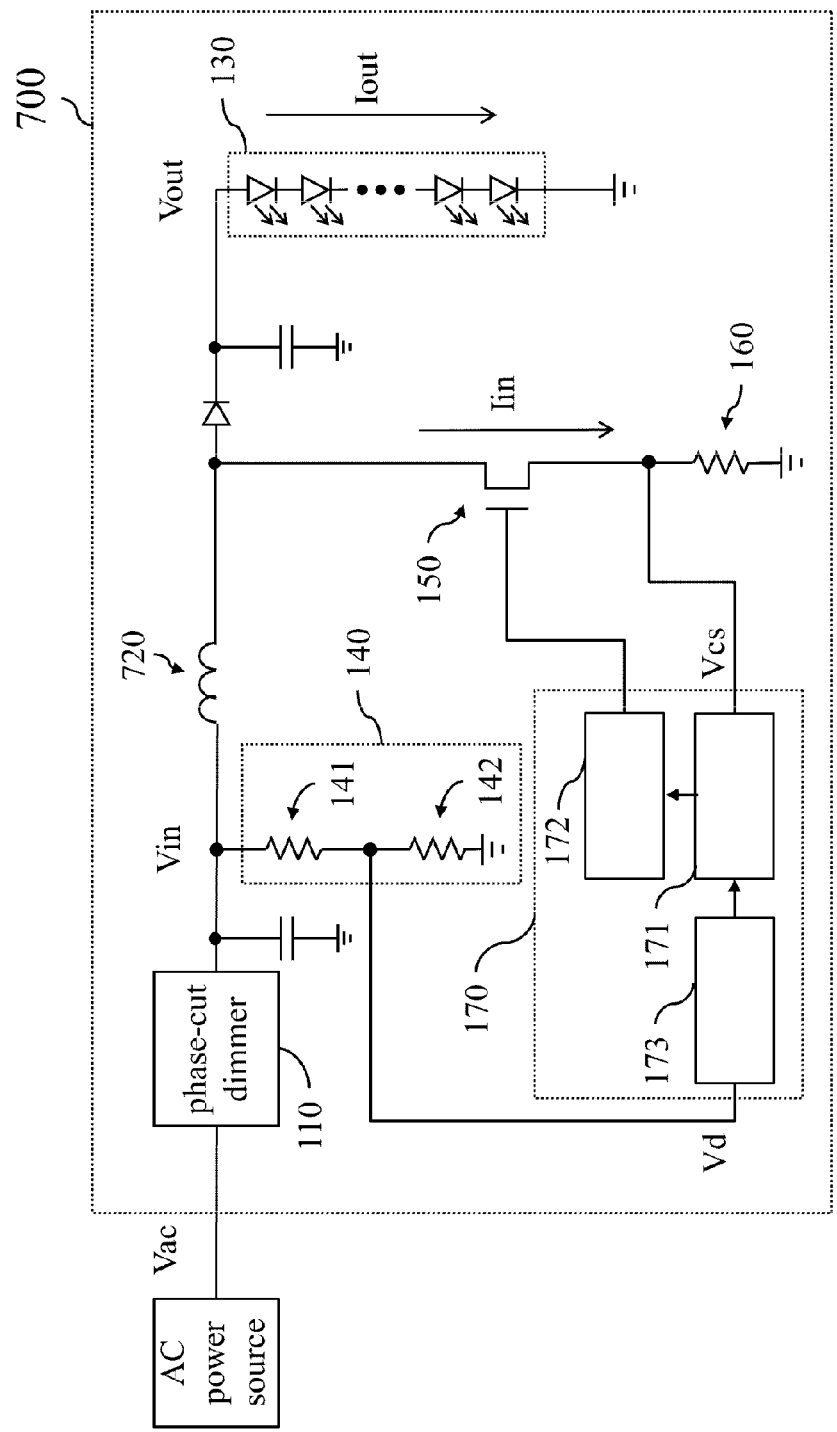
FIG. 7 shows a simplified functional block diagram of a phase-cut dimming system according to another embodiment of the present disclosure.

FIG. 7 shows a simplified functional block diagram of a phase-cut dimming system 700 according to another embodiment of the present disclosure. The phase-cut dimming system 700 comprises a phase-cut dimmer 110, an inductor 720, a group of LEDs 130, a voltage dividing circuit 140, a current switch 150, a resistor 160 and a LED control device 170. For the purposes of conciseness and clear explanation, some components, signals and connections thereof are not shown in FIG. 7. The implementations, the operations and the description of the components in the above dimmer systems may be applicable to the dimmer system 700, and not repeated here for the purpose of conciseness.

Similar to the embodiment in FIG. 1, the LED control device 170 is coupled with the voltage dividing circuit 140, the current switch 150 and the resistor 160. The LED control device 170 comprises a current control circuit 171, a driving signal generating circuit 172 and a phase-cut detection circuit 173. The control circuit 170 may detect whether the input signal Vin is phase-cut according to the voltage dividing signal Vd, and generate control signals for configuring the current control circuit to operation in the required status. When the input signal Vin is phase-cut, the LED control device 170 stores the signal values of the internal circuits in the storage devices. When the input signal is no longer phase-cut, the LED control device 170 may rapidly resume to the previous operation status according to the stored signal values. Therefore the LED control device 170 may configure the output current Iout more precisely according to the configuration of the phase-cut dimmer 110. In another embodiment, the LED control device 170 may be realized with the embodiments in FIGS. 5 and 6 to detect whether the input signal Vin is phase-cut according to the detection voltage signal Vcs.

In the above embodiment, the dimmer systems may cooperate with different types of regulator according to different design considerations and perform the required dimming function of the LEDs 130.

In the above embodiments, the LED control device 170 detects whether the input signal Vin is phase-cut according to only one of the voltage dividing signal Vd and the detection voltage signal Vcs. In another embodiment, the LED control device 170 may detect whether the input signal Vin is phase-cut according to both the voltage dividing signal Vd and the detection voltage signal Vcs. For example, the phase-cut detection circuit 173 compares the voltage dividing signal Vd and the detection voltage signal Vcs respectively with the reference voltage signals Vpc and Vpc1. When the voltage dividing signal Vd is less than the reference voltage signal Vpc and/or the detection voltage signal Vcs is less than the reference voltage signal Vpc1, the phase-cut detection circuit 173 determines the input signal Vin is phase-cut.

In the above embodiments, each functional block may be realized with analog circuits and/or digital circuits. For example, in one embodiment, the signal processing circuit 310 and the comparator circuit 320 are realized with analog circuits and the storage devices 350 and 360 are respectively realized with one or more capacitors. When the storage devices 350 and 360 are realized with capacitors, the signal values of the storage devices 350 and 360 may still slightly vary because of the capacitor leakage current even if the switches 350 and 360 are not conducted. For example, when the frequency of the AC input signal Vac is 60 Hz and the storage devices 350 and 360 are realized with capacitors, the stored voltage signals Vinv and Vcmp may decade less than 100 mV in the period T2 in FIG. 4.

In another embodiment, the signal processing circuit 310 and the comparator circuit 320 are realized with digital circuits. The signal processing circuit 310 further comprises an analog to digital converting circuit to convert the analog detection voltage signal Vcs into the digital representation for further signal processing. In this embodiment, the storage devices 350 and 360 may be realized with registers for storing the digital output signals of the signal processing circuit 310 and the comparator circuit 320. In this embodiment, the signal values stored in the storage 350 and 360 do not decade.

In another embodiment, the storage device 350 and 360 may start to vary respectively with the output signals Vo1 and Vo2 of the signal processing circuit 310 and the comparator circuit 320 according to the control signals generated by the phase-cut detection circuit 173. For example, the phase-cut detection circuit 173 may configure the storage devices 350 and 360 start to vary with the output signals Vo1 and Vo2 at a predetermined period after the input signal Vin is no longer phase-cut.

In another embodiment, the LED control device 170 may be realized with only one of the storage devices 350 and 360. In another embodiment, other circuits of the LED control device 170 may utilize the storage devices to store the signal values before the input signal Vin is phase-cut, and may rapidly resume to the previous operation status according to the stored signal values after input signal Vin is no longer phase-cut.

In another embodiment, to further reduce the power consumption, the driving signal generating circuit 172 may stop generating the pulse width modulated signal PWM when the input signal Vin is phase-cut according to the control signal of the phase-cut detection circuit 173.

In the embodiments above, the LED control device 170 may also normally function and supply the required voltage and/or the required current to the LEDs 130 when the input signal Vin is not phase-cut (i.e., the conduction angle is 180 degrees).

In the above embodiments, each functional block may be respectively realized with one or more circuit elements. Multiple functional blocks may also be integrated into one circuit element. For example, the storage devices 350 and 360 may be respectively configured in the interior or the exterior of the LED control device 170. In another embodiment, the current switch 150 may be integrated in the LED control device 170 so that the number of discrete circuit elements and the hardware complexity may be reduced.

In the above embodiments, the LED control device 170 may perform the dimming function by detecting whether the input signal Vin is phase-cut. Thus, even if the conduction angle of the input signal Vin is close to 180 degrees, the LED control device 170 may still correctly perform the dimming function. The LED control device 170 may perform the dimming function in a wider range of conduction angle so that the user may easily configure the LEDs 130 to the required brightness.

In the above embodiments, when the input signal Vin is phase-cut, the LED control device 170 stores the signal values of the internal circuits to the storage devices. When the input signal Vin is no longer phase-cut, the LED control device 170 may rapidly resume to the operation status before the input signal Vin is phase-cut according to the stored signal values. Thus, the LED control device 170 may configure the output current Iout supplied to the LEDs 130 more precisely according to the configuration of the phase-cut dimmer 110. The linearity of the phase-cut dimming system may be improved and the user may easily configure the LEDs to the required brightness.

In the above embodiments, the voltage dividing signal Vd and the detection voltage signal Vcs are commonly utilized in the power factor correction circuit. Therefore, the LED control device 170 may be easily integrated in the power factor correction circuit without occupying additional package pins. The functions of constant output current, power factor correction, LED driving and dimming may be integrated in a single integrated circuit for further reducing the hardware complexity.

In the drawings, the waveforms of some signals may be simplified or exaggerated for clear explanation, and the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. An LED control device for configuring a phase-cut dimming system according to an input signal; wherein the phase-cut dimming system comprises an LED and a current switch; comprising:

a current control circuit for coupling with the current switch, and for generating a second output signal according to a current flowing through the current switch;

a driving signal generating circuit for coupling with a control terminal of the current switch and the current control circuit, and for generating a driving signal to configure a conduction status of the current switch according to the second output signal and a periodic signal; and a phase-cut detection circuit for receiving the input signal, and for comparing the input signal with a second reference signal;

wherein in a first period in which the input signal is greater than the second reference signal, the phase-cut detection circuit configures a signal value of a second storage device to vary with the second output signal; in a second period in which the input signal is less than the second reference signal, the phase-cut detection circuit configures the second storage device to keep the signal value of the second storage device so as not to vary with the second output signal; in a third period in which the input signal is greater than the second reference signal, the phase-cut detection circuit configures the signal value of the second storage device to vary with the second output signal; and the second storage device is configured to be operably coupled with the current control circuit and the driving signal generating circuit, and wherein the current control circuit generates a first output signal according to the current flowing through the current switch and generates the second output signal according to the first output signal and a first reference signal; in the first period, the phase-cut detection circuit configures a signal value of a first storage device to vary with the first output signal; in the second period, the phase-cut detection circuit configures the first storage device to keep the signal value of the first storage device so as not to vary with the first output signal; in the third period, the phase-cut detection circuit configures the signal value of the first storage device to vary with the first output signal; the first storage device is configured to be operably coupled with the current control circuit; and the first storage device is configured to be in at least one of the interior of the LED control device and the exterior of the LED control device.

2. The LED control device of claim 1, wherein in the third period, the driving signal generating circuit generates the driving signal according to the second output signal, the signal value of the second storage device and the periodic signal.

3. The LED control device of claim 2, further comprising:
a second switch coupled between the current control circuit and the second storage device;
wherein when the phase-cut detection circuit configures the second switch to be not conducted, the signal value of the second storage device does not vary with the second output signal.

4. The LED control device of claim 1, wherein in the third period, the current control circuit generates the second output signal according to the first output signal, the signal of the first storage device and the first reference signal.

5. The LED control device of claim 4, further comprising:
a first switch coupled between the current control circuit and the first storage device;
wherein when the phase-cut detection circuit configures the first switch to be not conducted, the signal value of the first storage device does not vary with the first output signal.

6. The LED control device of claim 4, wherein the current control circuit generates the first output signal according to at least one of an average value and an accumulated value of the current flowing through the current switch.

7. An LED control device for configuring a phase-cut dimming system according to an input signal; wherein the phase-cut dimming system comprises an LED and a current switch, and a current flowing through the current switch flows through a resistor to generate a detection voltage signal; comprising:
a current control circuit for coupling with the current switch, and for generating a second output signal according to the current flowing through the current switch;
a driving signal generating circuit for coupling with a control terminal of the current switch and the current control circuit, and for generating a driving signal to configure a conduction status of the current switch according to the second output signal and a periodic signal; and
a phase-cut detection circuit for receiving the detection voltage signal, and for comparing the detection voltage signal with a third reference signal;

wherein in a first period in which the detection voltage signal is greater than the third reference signal, the phase-cut detection circuit configures a signal value of a second storage device to vary with the second output signal; in a second period in which the detection voltage signal is less than the third reference signal, the phase-cut detection circuit configures the second storage device to keep the signal value of the second storage device so as not to vary with the second output signal; in a third period in which the detection voltage signal is greater than the third reference signal, the phase-cut detection circuit configures the signal value of a second storage device to vary with the second output signal; and the second storage device is configured to be operably coupled with the current control circuit and the driving signal generating circuit, and wherein the current control circuit generates a first output signal according to the current flowing through the current switch and generates the second output signal according to the first output signal and a first reference signal; in the first period, the phase-cut detection circuit configures a signal value of a first storage device to vary with the first output signal; in the second period, the phase-cut detection circuit configures the first storage device to keep the signal value of the first storage device so as not to vary with the first output signal; in the third period, the phase-cut detection circuit configures the signal value of the first storage device to vary with the first output signal; the first storage device is configured to be operably coupled with the current control circuit; and the first storage device is configured to be in at least one of the interior of the LED control device and the exterior of the LED control device.

8. The LED control device of claim 7, wherein in the third period, the driving signal generating circuit generates the driving signal according to the second output signal, the signal value of the second storage device and the periodic signal.

9. The LED control device of claim 8, further comprising:
a second switch coupled between the current control circuit and the second storage device;
wherein when the phase-cut detection circuit configures the second switch to be not conducted, the signal value of the second storage device does not vary with the second output signal.

10. The LED control device of claim 7, wherein in the third period, the current control circuit generates the second output signal according to the first output signal, the signal of the first storage device and the first reference signal.

11. The LED control device of claim 10, further comprising:
a first switch coupled between the current control circuit and the first storage device;
wherein when the phase-cut detection circuit configures the first switch to be not conducted, the signal value of the first storage device does not vary with the first output signal.

12. The LED control device of claim 10, wherein the current control circuit generates the first output signal according to at least one of an average value and an accumulated value of the current flowing through the current switch.

* * * * *